United States Patent
Lee

(10) Patent No.: US 10,662,102 B2
(45) Date of Patent: May 26, 2020

(54) SLUDGE DRYING APPARATUS

(71) Applicant: Hyung Rak Lee, Incheon (KR)

(72) Inventor: Hyung Rak Lee, Incheon (KR)

(*) Notice: Subject to any disclaimer, the term of this patent is extended or adjusted under 35 U.S.C. 154(b) by 0 days.

(21) Appl. No.: 16/158,703

(22) Filed: Oct. 12, 2018

(65) Prior Publication Data

US 2019/0039933 A1     Feb. 7, 2019

Related U.S. Application Data

(63) Continuation of application No. PCT/KR2017/004029, filed on Apr. 13, 2017.

(30) Foreign Application Priority Data

Apr. 14, 2016 (KR) .................. 10-2016-0045328

(51) Int. Cl.
| | |
|---|---|
| *C02F 11/12* | (2019.01) |
| *F26B 25/04* | (2006.01) |
| *C02F 11/13* | (2019.01) |
| *C02F 11/125* | (2019.01) |
| *F26B 25/02* | (2006.01) |
| *F26B 3/22* | (2006.01) |
| *F26B 17/20* | (2006.01) |
| *B02C 19/22* | (2006.01) |
| *B01F 7/08* | (2006.01) |
| *F26B 3/24* | (2006.01) |

(52) U.S. Cl.
CPC ............. *C02F 11/12* (2013.01); *B01F 7/086* (2013.01); *B02C 19/22* (2013.01); *C02F 11/125* (2013.01); *C02F 11/13* (2019.01); *F26B 3/22* (2013.01); *F26B 3/24* (2013.01); *F26B 17/205* (2013.01); *F26B 25/02* (2013.01); *F26B 25/04* (2013.01); *B02C 2201/063* (2013.01); *F26B 2200/18* (2013.01)

(58) Field of Classification Search
CPC ......... C02F 11/12; C02F 11/125; C02F 11/13; B01F 7/086; F26B 3/22; F26B 2200/18; F26B 25/04; F26B 3/24; F26B 17/205; F26B 25/02; B02C 2201/063; B02C 19/22

See application file for complete search history.

(56) References Cited

U.S. PATENT DOCUMENTS

2006/0280026 A1* 12/2006 Dackefjord ......... B01F 7/00058
366/8

FOREIGN PATENT DOCUMENTS

| KR | 10-0853570 B1 | 8/2008 |
| KR | 10-2009-0124811 A | 12/2009 |
| KR | 10-1077495 B1 | 10/2011 |

OTHER PUBLICATIONS

An Office Action mailed by the Korean Intellectual Property Office dated Oct. 17, 2018, which corresponds to Korean Patent Application No. 10-2016-0045328 and is related to U.S. Appl. No. 16/158,703; with English language translation.

* cited by examiner

*Primary Examiner* — Cameron J Allen
(74) *Attorney, Agent, or Firm* — Studebaker & Brackett PC

(57) ABSTRACT

The inventive concept relates to a sludge drying apparatus, and more particularly to a sludge drying apparatus that may improve an efficiency of drying sludge that is sewage deposit residues and simplify a drying process.

1 Claim, 6 Drawing Sheets

SLUDGE DRYING APPARATUS

CROSS-REFERENCE TO RELATED APPLICATIONS

The present application is a continuation of International Patent Application No. PCT/KR2017/004029, filed on Apr. 13, 2017, which is based upon and claims the benefit of priority to Korean Patent Application No. 10-2016-0045328, filed on Apr. 14, 2016. The disclosures of the above-listed applications are hereby incorporated by reference herein in their entirety.

BACKGROUND

Embodiments of the inventive concept described herein relate to a sludge drying apparatus, and more particularly to a sludge drying apparatus that may improve an efficiency of drying sludge that is sewage deposit residues and simplify a drying process.

A oceanic discharge reference for wastes including sewage sludge has been significantly reinforced as'96 protocol of London Agreement came into effect, and Korean government revised Enforcement Degree for Ocean Environment Management Law (on Feb., 2006), and established a sewage sludge comprehensive measure in 2008 based on 'Sewage sludge management comprehensive measure' established on May 2007, and has pushed ahead construction of sewage sludge resourcing facilities for discharge of 0% to the ocean, investigation of sludge, distribution of the sewage sludge management technology, and revision of the sewage sludge related rules.

Further, a management guide for installation of sewage sludge treatment facilities was shaped up in 2011 to determine the purpose and range for management of facilities, and environmental problems due to sewage sludge are being positively coped with as the guides for support, installation, and management of government subsidies have been made clear.

In response, as of May, 2012, 43.3% of the sewage sludge except for decomposition, incineration, and solidification is dried, and 98.6% of the sewage sludge except of drying, powdering, and burial is utilized as a dried fuel.

Here, a drying process has to be accompanied first to dry sewage sludge containing moisture of 70 to 80% or more, and the sewage sludge drying method for this includes a direct drying method of directly heating sludge or bringing sludge into contact with hot wind (LNG, 400 to 800° C.) and an indirect drying method of using vapor (200° C.) or hot oil, and currently, a flash drier using hot wind, a rotary drier, and a multiple hearth furnace are generally used.

However, because most of the driers using hot wind dry moisture of a heating target (sewage sludge) through radiation, conduction, or convection of heat from a surface of the heating target to the interior of the sludge, much drying time is consumed and the sizes of the apparatuses are large.

SUMMARY

Embodiments of the inventive concept provide a sludge drying apparatus that may remarkably improve a capability of dehydrating moisture from sludge, which is introduced into a body, by compressing and feeding the sludge in one direction while agitating the sludge by using an agitation screw.

Embodiments of the inventive concept also provide a sludge drying apparatus that may improve drying efficiency by allowing sludge to be easily crushed in a process of compressing and feeding the sludge in one direction with a agitation screw by forming a plurality of crushing pins protruding from an inner surface of a jacket that corresponds to a body of the apparatus and remarkably improve an efficiency of processing the sludge into a recycled material.

In accordance with an aspect of the present invention, there is provided a sludge drying apparatus including a jacket having a long box shaped structure in which performance of a unidirectional feeding type drying process for sludge introduced into the jacket is allowed, an agitation screw configured to make a mixing state of components uniform by agitating the sludge contained in the jacket while being installed in the jacket along a lengthwise direction of the jacket and being revolved such that moisture contained in the sludge is dehydrated after the sludge is moved to one direction while being compressed at the same time, a heater configured to remove not only the moisture dehydrated by the agitation screw but also residual moisture left in the sludge according to a heat operation while surrounding side surfaces and a lower side of the jacket at the same time, and a driving device configured to transmit a rotation driving force to the agitation screw while being mounted on one side of the jacket.

Further, as a 'U'-shaped cross-sectional structure is formed in the jacket, an interior space for introducing and storing sludge and for installing the agitation screw may be provided in the jacket and a plurality of crushing pins for repeatedly crushing the sludge that is fed by the agitation screw while being compressed are formed on opposite inner surfaces and a bottom surface of the interior space at a specific interval along a lengthwise direction of the jacket to protrude.

Further, the agitation screw may include a rotary shaft rotated at a specific RPM by the driving device while crossing the interior space of the jacket in a lengthwise direction of the jacket, and a blade formed by forming the shaft such that the shaft has a screw thread surface along the lengthwise direction thereof and adapted to allow agitation, compression, and feeding of the sludge introduced into the jacket in one direction, and the blade may have cutaway recesses at portions corresponding to protruding locations of the crushing pins to prevent rotation of the blade from being hampered by the plurality of crushing pins formed on the opposite inner surfaces and the bottom surface of the jacket at a specific interval to protrude.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
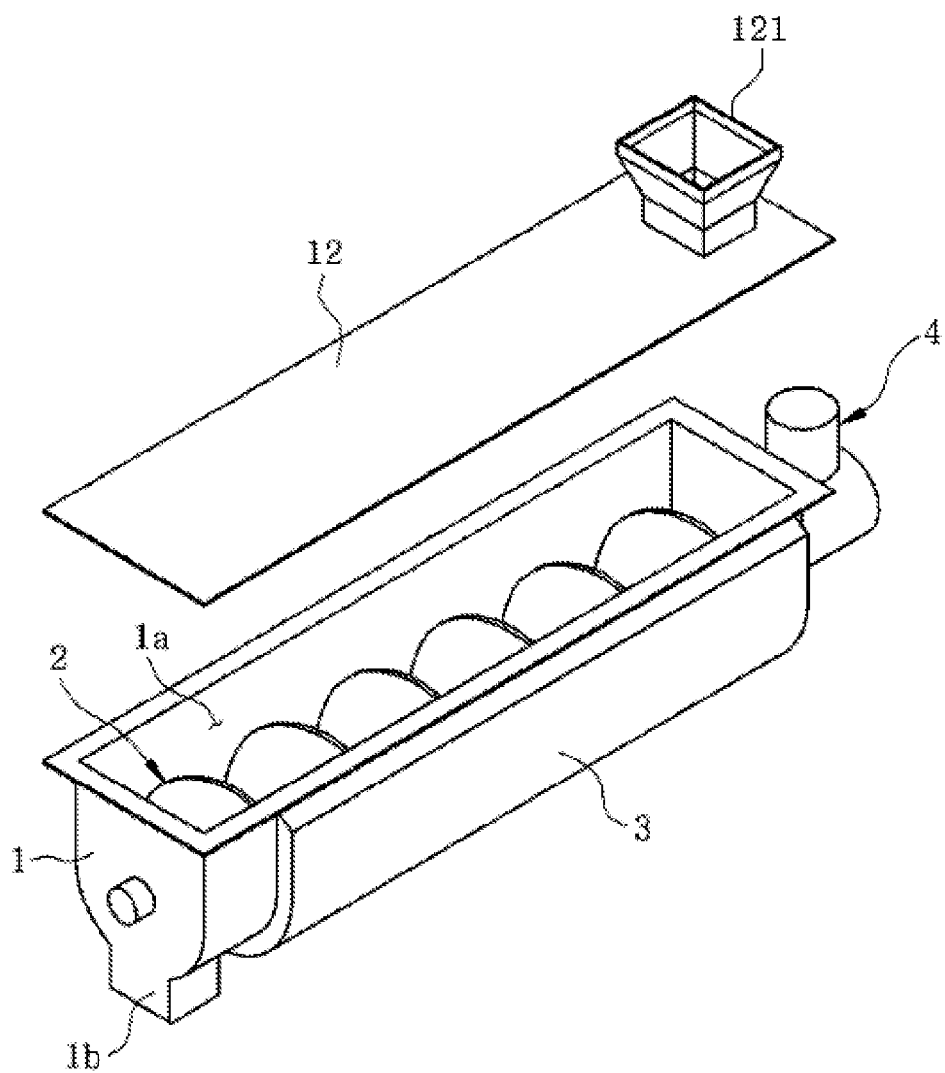
FIG. 1 is an exploded perspective view illustrating a configuration/structure of a sludge drying apparatus according to the inventive concept.

Hereinafter, embodiments of the inventive concept will be specifically described with reference to the accompanying drawings such that those skilled in the art to which the inventive concept pertains can readily carry out the inventive concept. First, throughout the specification, it is noted that the same or like reference numerals denote the same or like components even though they are provided in different drawings. Further, in the following description of the inventive concept, a detailed description of known functions and configurations incorporated herein will be omitted when it may make the subject matter of the inventive concept rather unclear.

Figure 2A:
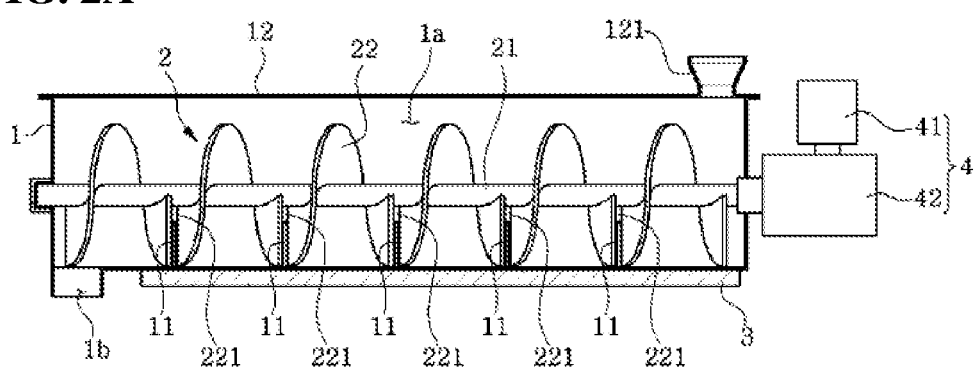
FIGS. 2A to 2C are a top sectional view, a side sectional view, and a front sectional view illustrating an internal structure of the sludge drying apparatus according to the inventive concept.
Figure 2B:
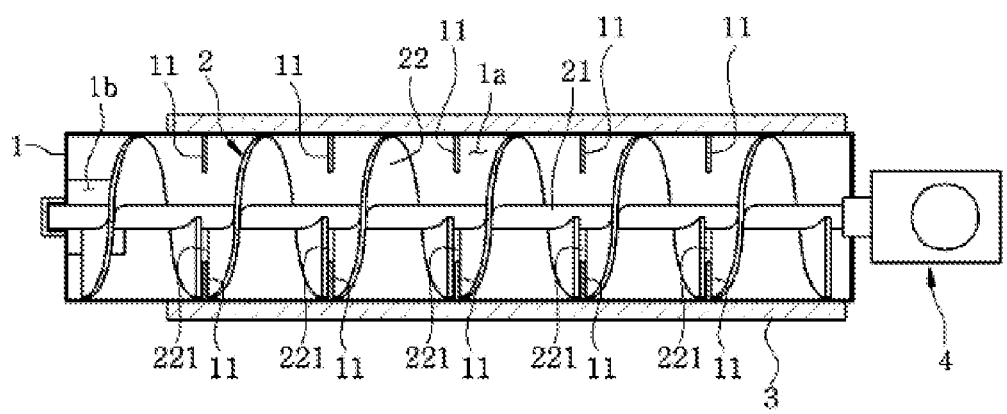
Figure 2C:
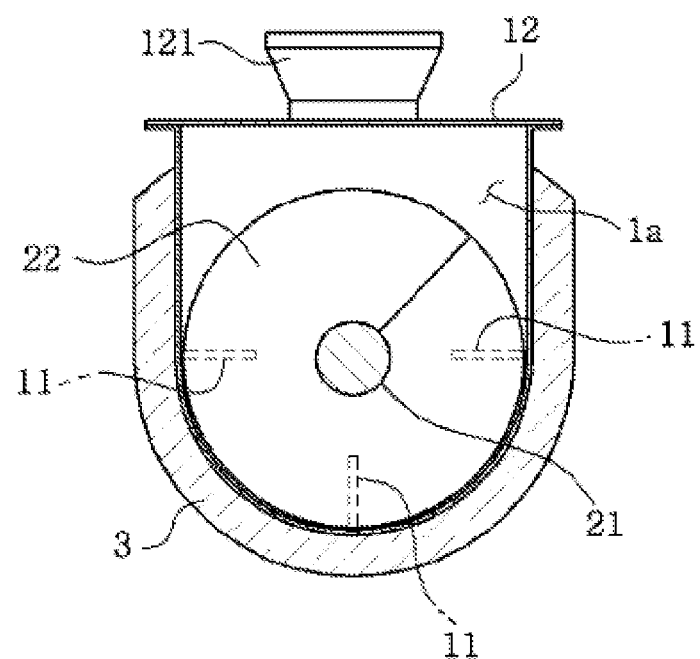
Figure 3:
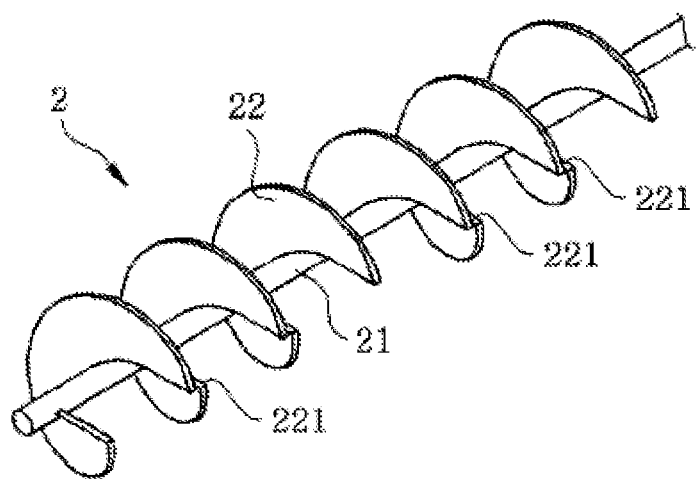
FIG. 3 is a perspective view of a main part illustrating a structure of an agitation screw in the sludge drying apparatus according to the inventive concept.
Figure 4:
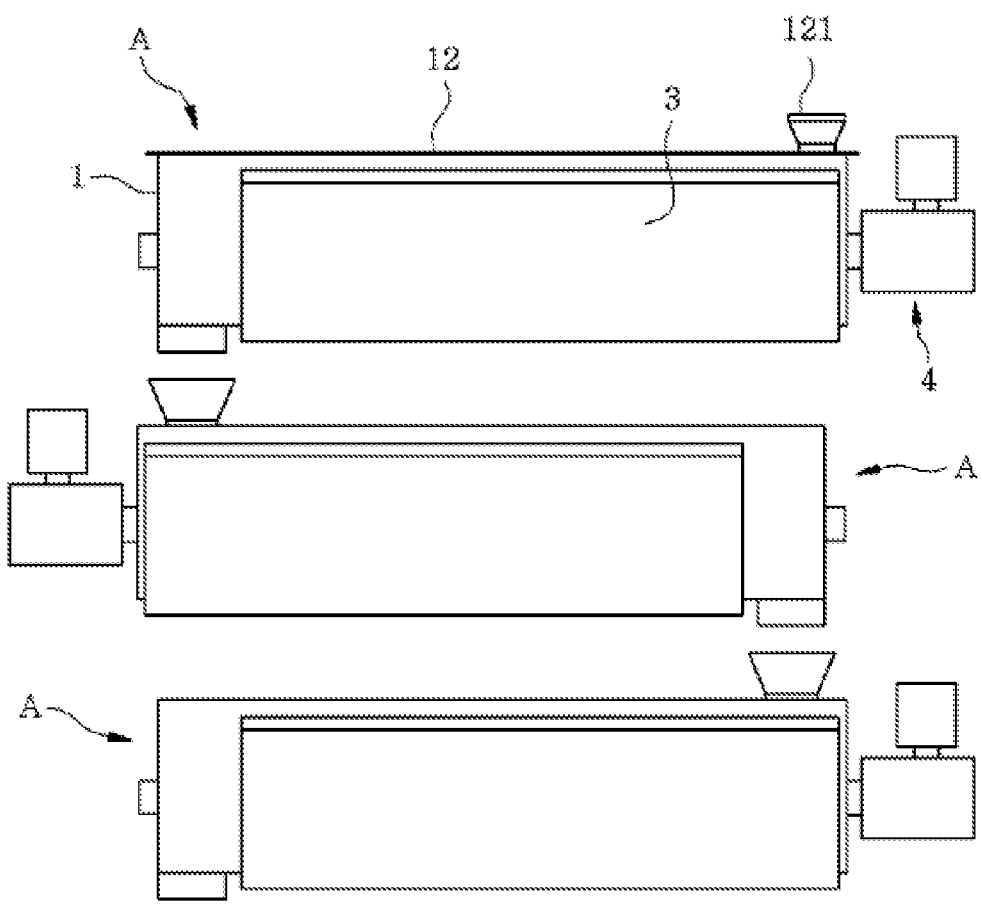
FIG. 4 is a use state view illustrating an embodiment of the sludge drying apparatus according to the inventive concept.

FIG. 1 is an exploded perspective view illustrating a configuration/structure of a sludge drying apparatus according to the inventive concept. FIGS. 2A to 2C are a top sectional view, a side sectional view, and a front sectional view illustrating an internal structure of the sludge drying apparatus according to the inventive concept. FIG. 3 is a perspective view of a main part illustrating a structure of an agitation screw in the sludge drying apparatus according to the inventive concept. FIG. 4 is a use state view illustrating an embodiment of the sludge drying apparatus according to the inventive concept.

As illustrated in FIGS. 1 to 2B, the sludge drying apparatus A according to the inventive concept includes a jacket (1) having a long box shape in which performance of a unidirectional feeding type drying process for sludge introduced into the jacket (1) is allowed, an agitation screw (2) configured to make a mixing state of components uniform by agitating the sludge contained in the jacket (1) while being installed in the jacket (1) along a lengthwise direction of the jacket (1) and being revolved such that moisture contained in the sludge is dehydrated after the sludge is moved to one direction while being compressed at the same time, and a heater (3) configured to remove (evaporate) not only the moisture dehydrated by the agitation screw (2) but also residual moisture left in the sludge according to a heat operation while surrounding side surfaces and a lower side of the jacket (1).

Further, it is preferable that a driving device (4) configured to transmit a rotation driving force to the agitation screw (2) is further included on one lengthwise end of the jacket (1).

The jacket (1) is a body of the apparatus for performing a unidirectional drying process for sludge contained, and as a 'U'-shaped cross-sectional view is formed as illustrated in FIG. 2C, an interior space 1a for storing a specific amount of sludge and for installing the agitation screw (2) configured to agitate the sludge stored in that way and feeding the sludge while compressing the sludge is provided. Further, a discharge hole (1b) for dropping and discharging the dried sludge is formed on a bottom surface of a tip end of one side corresponding to a terminal point of a feeding direction of the sludge.

Further, a plurality of crushing pins 11 for improving drying efficiency by finely crushing the sludge that is fed by the agitation screw 2 while being compressed are formed on opposite inner surfaces and a bottom surface of the jacket 1 at a specific interval along a lengthwise direction of the jacket 1 to protrude.

A finishing plate 12 for closing an opening may be further assembled at an upper end of the jacket 1, and it is preferable that a hopper 121 that allows easy introduction of the sludge is formed at a tip end of one side of the finishing plate 12 at a location that is opposite to the discharge hole 1b. This is for selecting an introduction location that is necessary for securing a feeding range (distance) that is optimized for agitating and compressing the sludge introduced into the interior space 1b with the agitation screw 2, heating the sludge with the heater 2, and discharging the sludge through the discharge hole 1b.

The agitation screw 2 is adapted to allow uniformity of components of the sludge and dehydration of the sludge through the agitation, compression, and feeding of the sludge introduced into the interior space 1a of the jacket 1, and as illustrated in FIGS. 2A and 3, includes a rotary shaft 21 rotated at a specific RPM (revolutions per minutes) by the driving device 4 while crossing the interior space 1a of the jacket 1 in a lengthwise direction of the jacket 1, and a blade 22 formed by forming the shaft 21 such that the shaft 21 has a screw thread surface along the lengthwise direction thereof and adapted to allow agitation, compression, and feeding of the sludge introduced into the interior space 1a in one direction.

Meanwhile, the blade 22 has cutaway recesses 221 at portions corresponding to protruding locations of the crushing pins 11 to prevent rotation of the blade 22 from being hampered by the plurality of crushing pins 11 formed on the opposite inner surfaces and the bottom surface of the jacket 1 at a specific interval to protrude. Accordingly, as the sludge in the form of a lump is repeatedly crushed by the crushing pins 11 in a process of agitating the sludge and compressing and feeding the sludge at the same time by the blade 22 of the agitation screw 2, drying efficiency may be maximized.

The heater 3 is adapted to remove moisture contained in the sludge that is fed along the interior space 1a through heating of the jacket 1 and is heated through supply of an external power source while surrounding an outer surface of the jacket 1 as illustrated in FIG. 2C, and it is preferable that the heat includes any one of the devices that are directed to heating for transferring heated thermal energy, such as a nichrome wire, a coil heater, a drier heater, a quartz tube heater, an infrared ray heater, and a cable heater.

Further, the drying efficiency of the sludge in contact with a surface of the jacket 1 may be remarkably improved by uniformly forming a surface temperature of the jacket 1 as a whole according to the above-mentioned configuration.

The driving device 4 is adapted to agitate the sludge and feed the sludge in one direction through rotation of the agitation screw 2, and includes a driving motor 41 that is rotated when an external power source is supplied, and a reducer 42 configured to operate in conjunction with the agitation screw 2 through rotation of the driving motor 41 and damp a rotational load of the rotary shaft 21 of the agitation screw 2.

An operation of the sludge drying apparatus A according to the inventive concept having the above-mentioned configuration will be described in detail.

The sludge for drying is introduced into the interior space 1a of the jacket 1 by a specific amount or continuously through the hopper 121 of the finishing plate 12 in a state in which the jacket 1 is heated by operating the driving device 4 through supply of an external power source and accordingly operating the heater 3 while the driving device 4 is operated (rotated) in conjunction with the agitation screw 2, and the drying process is performed by agitating, compressing, and feeding the sludge stored in the interior space 1a of the jacket 1 along the lengthwise direction of the jacket 1 and dehydrating (removing) the moisture in the feeding process.

More particularly, rotational power of the driving motor 41 is transmitted to the reducer 42 through the driving shaft and the rotary shaft 21 of the agitation screw 2 is rotated via the reducer 42, the sludge introduced into the interior space 1a is compulsorily fed to the discharge hole 1b by the spiral blade 22 of the agitation screw 2 that rotates. Then, drying efficiency is improved by a uniform mixing operation of the components trough the agitation by the blade 22 and moisture may be primarily removed by lowering water content of the sludge through the dehydration operation by the compression and feeding.

The lump of the compressed sludge may be crushed finely by the plurality of the crushing pins 11 formed the opposite inner surfaces and the bottom surface of the jacket 1 at a specific interval to protrude while the sludge is fed by the blade 22, and drying efficiency may be secondarily improved through repetition of the crushing operation.

The temperature of the interior space 1a is increased by a heat source generated by the heater 3 that surrounds an outside of the jacket 1, and moisture is secondarily removed by further lowering the water content of the sludge as the sludge is heated and moisture is evaporated.

Thereafter, via the compression and feeding of the sludge, the sludge that passed through the drying process is discharged to the outside through the discharge hole 1b formed on a bottom surface of the tip end of one side of the jacket 1 to finally finish the drying process of the sludge.

Meanwhile, as illustrated in FIG. 4, a drying process for the sludge by which the water content of the sludge may be further lowered may be performed by disposing a plurality of sludge drying apparatuses A according to the inventive concept vertically and repeating the drying process using the plurality of sludge drying apparatuses.

In this case, because the hopper 121 formed on one side of the finishing plate 12 of a sludge drying apparatus disposed on the lower side is disposed at the same location as the discharge hole 1b formed on the bottom surface of one side of the jacket 1 of the sludge drying apparatus disposed on the upper side, the sludge that passed through the drying process through the upper sludge drying apparatus is discharged to the outside through the discharge hole 1b and is introduced into the interior space 1a of the jacket 1 through the hopper 121 of the lower sludge drying apparatus so that a continuous drying process is performed.

In summary, in the sludge drying process using the sludge drying apparatus A according to the inventive concept, drying efficiency may be improved by effectively removing the moisture contained in the sludge through the agitation, compression, and feeding using the agitation screw 2, and the crushing using the plurality of crushing pins 11 formed on the inner surface of the jacket 1 at a specific interval.

As can be seen from the above description, the sludge drying apparatus according to the inventive concept may achieve a further optimized sludge drying process by easily dehydrating moisture through the agitation, and unidirectional compression and feeing of the sludge using the agitation screw that revolves in the interior of the jacket, repeatedly crushing the sludge using the plurality of crushing pins, and easily evaporating the moisture contained in the sludge by using the heater that surrounds the jacket.

Further, because the sludge may be mixed with a coal fuel, for example, of a thermoelectric power plant or may be solidified to be positively utilized as regenerative energy, such as a cover material of a landfill site, a material of cement, or compost, through the above-mentioned improvement of the efficiency of the drying process, the inventive concept may solve an environment contamination problem due to the discharge of sludge and may contribute to government businesses, for example, related to construction of a sewage sludge resourcing facility for discharge of the sludge to the ocean of 0%, investigation of components of the sludge, distribution of a sludge management technology and development and activation of the corresponding industries.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:
1. A sludge drying apparatus comprising:
a jacket having a long box shaped structure in which performance of a unidirectional feeding type drying process for sludge introduced into the jacket is allowed;
an agitation screw configured to make a mixing state of components uniform by agitating the sludge contained in the jacket while being installed in the jacket along a lengthwise direction of the jacket and being revolved such that moisture contained in the sludge is dehydrated after the sludge is moved to one direction while being compressed at the same time;
a heater configured to remove not only the moisture dehydrated by the agitation screw but also residual moisture left in the sludge according to a heat operation while surrounding side surfaces and a lower side of the jacket; and
a driving device configured to transmit a rotation driving force to the agitation screw while being mounted on one side of the jacket, wherein:
the jacket has a 'U'-shaped cross-sectional structure and an interior space for introducing and storing sludge and for installing the agitation screw;
a plurality of crushing pins that repeatedly crush the sludge that is fed by the agitation screw while being compressed are formed on opposite inner surfaces and a bottom surface of the interior space at a specific interval along a lengthwise direction of the jacket to protrude;
the agitation screw includes:
a rotary shaft rotated at a specific RPM by the driving device while crossing the interior space of the jacket in a lengthwise direction of the jacket; and
a blade formed by forming the shaft such that the shaft has a screw thread surface along the lengthwise direction thereof and configured to simultaneously perform agitating, compressing, and feeding of the sludge introduced into the jacket in one direction;
the blade has cutaway recesses at portions corresponding to protruding locations of the plurality of crushing pins to prevent rotation of the blade from being hampered by the plurality of crushing pins formed on the opposite inner surfaces and the bottom surface of the jacket at the specific interval to protrude; and
the plurality of crushing pins repeatedly crush the sludge in a form of a lump during the process of agitating, compressing, and feeding the sludge by the blade.

* * * * *